United States Patent
Zou et al.

(10) Patent No.: US 11,419,017 B2
(45) Date of Patent: Aug. 16, 2022

(54) METHODS FOR MOBILITY LATENCY REDUCTION IN A HIERARCHICAL NR ARCHITECTURE

(71) Applicant: Huawei Technologies Co., Ltd., Shenzhen (CN)

(72) Inventors: Jialin Zou, Randolph, NJ (US); Tingting Geng, Shanghai (CN); Le Yan, Shanghai (CN); Qinghai Zeng, Shanghai (CN); Yalin Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 25 days.

(21) Appl. No.: 16/895,745

(22) Filed: Jun. 8, 2020

(65) Prior Publication Data

US 2020/0305037 A1   Sep. 24, 2020

Related U.S. Application Data

(63) Continuation of application No. PCT/CN2017/115654, filed on Dec. 12, 2017.

(51) Int. Cl.
*H04W 36/00* (2009.01)
*H04W 36/30* (2009.01)
(Continued)

(52) U.S. Cl.
CPC ... *H04W 36/0069* (2018.08); *H04W 36/0077* (2013.01); *H04W 36/30* (2013.01); *H04W 36/32* (2013.01); *H04W 36/38* (2013.01)

(58) Field of Classification Search
None
See application file for complete search history.

(56) References Cited

U.S. PATENT DOCUMENTS 8,630,255 B1   1/2014 Kunz et al.
8,938,197 B2   1/2015 Zhou et al.
(Continued)

FOREIGN PATENT DOCUMENTS

CN   101562851 A   10/2009
CN   102223730 A   10/2011
(Continued)

OTHER PUBLICATIONS

3rd Generation Partnership Project; Technical Specification Group Radio Access Network; NR; Radio Resource Control (RRC); Protocol specification (Release 15 ), 3GPP TS 38.331 V0.1.0 (Oct. 2017), 42 pages.

(Continued)

*Primary Examiner* — Kodzovi Acolatse
(74) *Attorney, Agent, or Firm* — Slater Matsil, LLP

(57) ABSTRACT

A method and system for mobility latency reduction in a hierarchical NR architecture is provided. In an embodiment, a method in a network component for handover of a UE includes configuring, by the network component, at least one TRP determined according to UE mobility information. The configuring the at least one target TRP is performed prior to the UE moving into a border area between the at least one target TRP and a first serving TRP. Configuring the at least one target TRP results in the at least one target TRP being configured to act as a secondary serving TRP to the UE. The method also includes configuring at least one target TRP and the UE with corresponding dedicated access resource and monitoring opportunities. The method also includes activating a connection and data communication between the UE and the at least one pre-configured secondary serving TRP.

27 Claims, 10 Drawing Sheets

(51) Int. Cl.
*H04W 36/32* (2009.01)
*H04W 36/38* (2009.01)

(56) References Cited

U.S. PATENT DOCUMENTS

| | | | |
|---|---|---|---|
| 10,033,580 | B2 | 7/2018 | Pang et al. |
| 10,484,988 | B2 | 11/2019 | Chae et al. |
| 10,624,003 | B2 | 4/2020 | Dai et al. |
| 2011/0098072 | A1* | 4/2011 | Kim .............. H04B 7/0456 455/509 |
| 2012/0281544 | A1* | 11/2012 | Anepu .............. H04B 7/024 370/241 |
| 2017/0070907 | A1 | 3/2017 | Kaushik et al. |
| 2017/0332283 | A1* | 11/2017 | Kubota .............. H04W 36/0058 |
| 2018/0160336 | A1 | 6/2018 | Dai et al. |
| 2019/0166538 | A1* | 5/2019 | Wong .............. H04W 84/005 |
| 2020/0084776 | A1 | 3/2020 | Zhang et al. |
| 2020/0305038 | A1* | 9/2020 | Tooher .............. H04W 24/10 |

FOREIGN PATENT DOCUMENTS

| | | |
|---|---|---|
| CN | 102238665 A | 11/2011 |
| CN | 102844993 A | 12/2012 |
| CN | 103702373 A | 4/2014 |
| CN | 106465367 A | 2/2017 |
| CN | 106470499 A | 3/2017 |
| CN | 106817776 A | 6/2017 |
| CN | 107005907 A | 8/2017 |
| EP | 2733974 A4 | 10/2014 |
| EP | 3062555 A1 | 8/2016 |
| WO | 2009068592 A1 | 6/2009 |
| WO | 2016055095 A1 | 4/2016 |
| WO | 2017020253 A1 | 2/2017 |
| WO | 2017173037 A1 | 10/2017 |

OTHER PUBLICATIONS

Nokia, "Alcatel-Lucent Shanghai Bell, Non-coherent Multi-node Transmission for URLLC in the 5G New Radio", 3GPP TSG RAN WG1 NR Ad-Hoc Meeting, R1-1701075, Jan. 16-20, 2017, 5 pages, Spokane, USA.

Intel Corporation, "Resource allocation for PUCCH during initial access", 3GPP TSG RAN WG1 Meeting #90, R1-1712583, Aug. 21-25, 2017, 4 pages, Prague, P. R. Czechia.

ZTE, "Considerations on SPS in FeNB-IoT", 3GPP TSG-RAN WG2 Meeting#99, R2-1708370, Aug. 21-25, 2017, 2 pages, Berlin, Germany.

Huawei, et al., "Potential Advantages of multi-connectivity with multiple MAC entities within an NR cell", 3GPP TSG-RAN WG2 #100, R2-1712514, Nov. 27-Dec. 1, 2017, 6 pages, Reno, USA.

Interdigital, Inc., "RACH Configuration in Handover", 3GPP TSG-RAN WG2 #100, R2-1712785, Nov. 27-Dec. 1, 2017, 3 pages, Reno, USA.

Hong Liang, "Optimization of the LTE Handover Mechanism", Nanjing University of Posts and Telecommunications, English Abstract Only, Apr. 2012, 2 Pages.

Hytonen, V., et al., "Coordinated Multi-Cell Resource Allocation for 5G Ultra-Reliable Low Latency Communications", 2017 European Conference on Networks and Communications (EuCNC), Jun. 12-15, 2017, 5 Pages.

\* cited by examiner

METHODS FOR MOBILITY LATENCY REDUCTION IN A HIERARCHICAL NR ARCHITECTURE

CROSS REFERENCE TO RELATED APPLICATIONS

This Application is a continuation of PCT Application No. PCT/CN2017/115654 filed on Dec. 12, 2017 entitled "Methods for Mobility Latency Reduction in a hierarchical NR Architecture".

TECHNICAL FIELD

The present disclosure relates generally to a system and method for communicating in a wireless network, and, in particular embodiments, to a system and method for handover of user equipment in a wireless network.

BACKGROUND

Generally, due to the hierarchical architecture of the new radio (NR) in 5G, a large latency may be introduced by the long backhaul and the transmission delay over the backhaul between two transmission reception points (TRPs) of different central units (CUs) can be excessive. Normally, cross CU handovers (HOs) require a significant amount of signalling exchanges over the backhaul. Because of the large amount of signalling exchanges between the source and target nodes over the backhaul, a significant amount of latency may be accumulated. If those signalling exchange steps are on the time critical path of the HO, a large HO latency may be acquired. The large HO latency may result in the UE traveling too far away from the source TRP to maintain the link between the UE and the source TRP in good quality. Thus, the over-the-air signalling exchange between the UE and the source TRP to may be performed under a significantly degraded link condition at the source. This may lead to an increased HO failure rate and performance degradation. As a result, the NR Ultra-Reliable Low-Latency Communications (URLLC) requirements cannot be met for fast moving UEs. Therefore, an improved method for HO is needed.

SUMMARY

In an embodiment, a method in a network component for handover of a user equipment (UE) includes configuring, by the network component, at least one target secondary serving transmission reception point (TRP) determined according to UE mobility information. Configuring the at least one target secondary serving TRP is performed prior to the UE moving into a border area between the at least one target secondary serving TRP and a first TRP (i.e., a source TRP). Configuring that at least one target TRP results in the at least one target TRP being configured to act as a second serving TRP to the UE, configuring at least one target TRP and the UE with a corresponding dedicated access resource, and providing monitoring opportunities to the at least one target TRP and UE. All the configuration information, including the dedicated access resources (time/frequency resources and the preamble which serves as the implicit target initiated activation indication) allocated for accessing to the source TRP, and the monitoring opportunities determined by the target TRP are carried by the connection reconfiguration message sent from the source TRP to the UE. The method also includes activating a connection and data communication between the UE and at least one pre-configured target secondary serving TRP.

In an embodiment, a method in a transmission reception point (TRP) includes receiving, at the TRP, configuration information prior to a user equipment being within a coverage area of the TRP. The configuration information causes the TRP to allocate resources to serve the UE and become a secondary TRP in a Dual Connectivity (DC) structure. The configuration information allows the TRP to allocate dedicated access resources to the UE for it to initiate or relay an activation request. The configuration information configures monitor opportunities between the TRP and the UE. The configuration procedure uses at least one S-TRP addition request acknowledge message and a Radio Resource Control (RRC) Connection Reconfiguration message to assign at least one set of a C-RNTI, a CORESET, a PDCCH, and/or monitor opportunities associated with the TRP to the UE and the TRP identified as a target TRP by a network component according to mobility information of the UE. The method also includes activating the connection and data communication between the secondary TRP and the UE according to an activation event.

In an embodiment, a method in a user equipment (UE) includes receiving, at the UE, an identification of one or more target transmission reception points (TRPs) from a source TRP before the UE is within a coverage area of any of the one or more target TRPs. The one or more target TRPs are identified according to UE mobility information. The method also includes receiving dedicated access resources allocated at the target TRP(s) or at the source TRP for the UE to initiate or relay an activation request to the target TRP or an activation notification to the source TRP. The method also includes accepting configuration of monitor opportunities between the target TRP(s) and the UE. The method also includes receiving the configuration of a Radio Resource Control (RRC) Connection Reconfiguration message carrying at least one set of a C-RNTI, a CORESET, a PDCCH, and/or the monitor opportunities associated with the target TRP(s). The method also includes activating a secondary TRP from one of the one or more target TRPs to communicate with the UE according to an activation event.

In an embodiment, a network node in a wireless network includes a processor and a computer readable storage medium storing programming for execution by the processor. The programming includes instructions to configure at least one target transmission reception point (TRP) determined according to UE mobility information. Configuring the at least one target TRP is performed prior to the UE moving into a border area between the at least one target TRP and a first serving TRP. The configuring the at least one target TRP results in the at least one target TRP being configured to act as a secondary (serving) TRP to the UE. The configuring also provides at least one target TRP and the UE with a corresponding dedicated access resource and monitoring opportunities. The programming also includes instructions to activate the communications of the UE to the at least one target TRP.

In an embodiment, a transmission reception point (TRP) in a wireless network includes a processor and a computer readable storage medium storing programming for execution by the processor. The programming includes instructions to receive configuration information prior to a user equipment (UE) being within a coverage area of the TRP. The configuration information causes the TRP to allocate resources to serve the UE and become a secondary TRP. The TRP is identified as a target TRP by a network component according to mobility information of the UE. The configuration information allows the TRP to allocate dedicated access resources to the UE for the UE to initiate or relay an activation request. The configuration information also configures monitor opportunities between the TRP and the UE. The configuration procedure uses at least one S-TRP addition request acknowledgement message and a Radio Resource Control (RRC) Connection Reconfiguration message to assign at least a C-RNTI, a CORESET, and a PDCCH associated with the TRP to the UE. The programming also includes instructions to activate the TRP to become a serving TRP to the UE according to an activation event.

In an embodiment, a user equipment (UE) in a wireless network includes a processor and a computer readable storage medium storing programming for execution by the processor. The programming includes instructions to receive an identification of one or more target transmission reception points (TRPs) from a source TRP before the UE is within a coverage area of any of the one or more target TRPs. The one or more target TRPs is identified according to UE mobility information. The programming also include instructions to receive dedicated access resources allocated at the target TRP(s) or the source TRP for the UE to initiate or relay an activation request to the target TRP or the activation notification to the source TRP. The programming also includes instructions to accept configuration of monitor opportunities between the target TRP(s) and the UE and to receive the configuration of a Radio Resource Control (RRC) Connection Reconfiguration message carrying at least a C-RNTI, a CORESET, and a PDCCH associated with the target TRP(s). The programming also includes instructions to activate a connection and communication to one of the one or more target TRPs according to an activation event.

In one or more aspect, the configuring at least one target TRP includes configuring a plurality of target TRPs to be the secondary TRPs and the activating (the connection to) one of the plurality of the secondary serving TRPs.

In one or more aspect, the UE mobility information includes one of UE travel route, UE location, UE speed, and UE location history.

In one or more aspect, activating the secondary TRP includes a target TRP initiated activation.

In one or more aspect, activating the secondary TRP includes a UE initiated activation.

In one or more aspect, the activating is initiated according to a secondary TRP activation criteria.

In one or more aspect, a target secondary TRP activation criteria includes a corresponding UE's Uplink signal quality is above a threshold for a target TRP initiated activation, a target signal quality is above a threshold and/or a source signal quality is below a threshold for a UE initiated activation.

In one or more aspect, the activation is initiated according to receipt of a signal from one of the UE and the at least one target TRP.

In one or more aspect, the activation is notified according to receipt of a signal that is signaled to the network component via backhaul signaling from the target TRP.

In one or more aspect, the configuring the at least one target TRP is performed prior to the UE obtaining a reliable measurement on the target TRP.

In one or more aspect, the method further includes pre-configuring and using a dedicated access resource for the UE to relay an activation indication to one of a source TRP and one of the target secondary TRPs.

In one or more aspect, the method further includes pre-configuring and using one or more monitor opportunities between the one of the target secondary TRPs and the UE for the one of the target secondary TRPS to send an activation notification to the UE.

In one or more aspect, the method further includes pre-configuring at least one of a S-TRP addition request acknowledgement message and Radio Resource Control (RRC) Connection Reconfiguration message carrying at least a C-RNTI), a CORESET, and a Physical Downlink Control Channel (PDCCH) associated with one of the target secondary TRPs to the UE.

In one or more aspect, an activation trigger at the target secondary TRP is based on a measurement of the UE's uplink reference signals.

In one or more aspect, the activation event includes an activation initiated by an uplink measurement of the corresponding UE above a threshold at the TRP.

In one or more aspect, an activation notification is transmitted at a time slot defined in pre-configured monitor opportunities.

In one or more aspect, an activation notification is transmitted through PDCCH addressed to the C-RNTI assigned to the UE.

In one or more aspect, an activation notification is transmitted through a backhaul to a source TRP.

In one or more aspect, wherein the activation event includes receiving an activation request from one of the UE and a source TRP.

In one or more aspect, the activation request is detected and received from a pre-allocated dedicated access resource to the UE.

In one or more aspect, further comprising monitoring wireless signals to determine if the UE is within the coverage area of the TRP, wherein activating the TRP for data communication according to a measurement of an uplink reference signal from the UE.

In one or more aspect, the activation event includes a signal received from one of the source TRP and one of the one or more target TRPs.

In one or more aspect, the activation event includes a determination that a signal measurement of a signal from one of the one or more target TRPs exceeds a threshold.

In one or more aspect, the activation event includes a determination that a signal measurement from the source TRP is below a threshold.

In one or more aspect, the activation event triggers the UE initiating or relaying the activation request to the target TRP, or relaying the activation notification to the source TRP via pre-allocated access resources respectively.

In one or more aspect, monitoring the PDCCH or time slots of monitor opportunities to receive the activation notification from the target TRP.

In one or more aspect, the method further includes receiving an identification of an order in which the one or more target secondary TRPs are to become a serving TRP.

An advantage of one or more aspects of the disclosure is pre-configuring target TRPs before the UE moves into a coverage border area between a source TRP and a target TRP such that signaling between the source TRP and the UE during a HO procedure while the UE is in the coverage border area is minimized thereby reducing the likelihood of HO failure due to poor channel quality between the source TRP and the UE. These and other advantages of the disclosure will be recognized by those of ordinary skill in the art.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
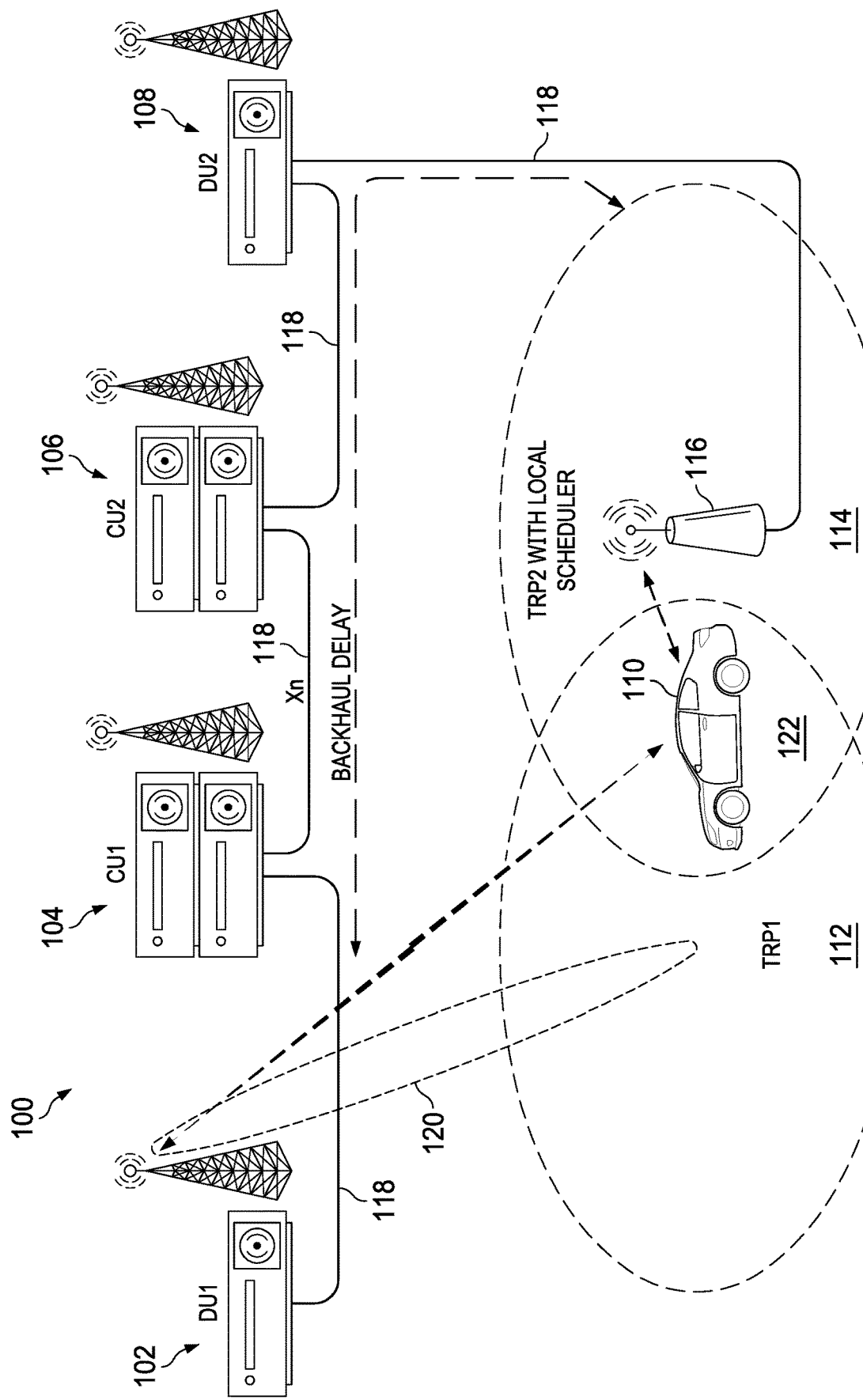
FIG. 1 shows an embodiment of a network.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods to preconfigure or pre-add one or more target TRPs as the secondary gNB/secondary TRP (SgNB/S-TRP) for Dual-Connectivity (DC) based HO of a UE based on trip route information of the UE even before the UE has reliable measurement on the target(s). In an aspect, when a UE moves across pre-configured Scells/S-TRPs, only target activation signalling at MAC is used to activate the target SgNB(s)/S-TRP(s). In an aspect, with RRC signalling, the pre-configuration allocates MAC resources for the UE to relay activation request or notification to the target DU/TRP or the source DU/TRP respectively where the DU is a gNB in the CU/DU/TRP radio network architecture. In another aspect, the pre-configuration configures both the UE and the potential HO targets with monitoring opportunities corresponding to each potential target cell. In an aspect, the pre-configuration also assigns to the UE, via the Radio Resource Control (RRC) Connection Reconfiguration message, the target DU/TRP associated information including the C-RNTI at the target (if changed), CORESET, and the Physical Downlink Control Channel (PDCCH). After the pre-configuration, the target DU/TRP becomes the SgNB/S-TRP under DC architecture subject to the activation.

The methods described in this disclosure are generically applied to the HOs between the "cells", "gNBs" or "TRPs". The term TRPs are used in this specification without loss of the generality.

The pre-configured target activation for DC can be initiated by the source node, target node, or the UE whichever make the decision first.

In the case of the source DU/TRP triggering the target activation, if the backhaul delay is small, the source cell/TRP sends the activation request (AR) to the target Scell/S-TRP via the backhaul, and the target Scell/S-TRP sends the activation MAC IE to the UE. If backhaul delay is large, the source cell/TRP sends the activation MAC IE to the UE, and the UE sends the AR to the target Scell or S-TRP.

In the case of the target DU/TRP triggering autonomous activation, the DC (or SgNB/S-TRP) activation can be triggered at the target based on uplink measurement on the pre-configured UE and other information of the UE such as its speed/location, etc. If backhaul delay is small, the target DU/TRP sends the activation notification to the source DU/TRP via the backhaul, and the source DU/TRP sends the activation MAC IE to the UE. If backhaul delay is large, the target DU/TRP sends the activation notification MAC IE to the UE, and the UE sends the AR to the source DU/TRP and the acknowledgement back to the target. After the pre-configuration is completed, for inter-cell operation the UE monitors the targets based on the pre-configured monitoring opportunities. When the activation is triggered, the target node sends out the activation notification on the pre-configured time/slot (monitoring opportunities). When tight synchronization condition is met (e.g. in the intra-cell case), after the pre-configuration is completed, the UE monitors the CORESET, PDCCH of the target cell. When the activation is triggered, the target node sends out the activation notification on its PDCCH. The UE can used its C-RNTI associated with the target S-TRP to decode the information from the PDCCH. Upon receive the activation notification from the target, the UE relays the activation notification to the source node via pre-configured dedicated MAC resources and sends back an acknowledgement to the target node. The activation request from the UE can be carried by pre-allocated MAC resources implicitly (e.g. pre-assigned dedicated preamble) or explicitly.

In the case of the source cell triggering the activation and the activation request is sent via the UE path (not via the backhaul), the activation request from the source node to the UE can contain requests to multiple target SgNB/STRPs. The request contains a list of multiple target Scell IDs and/or CSI-RS IDs associated with the S-TRPs in the order of expected entering by the UE. The UE relays the AR to the first immediate target Scell/S-TRP right after it received AR from the source cell/TRP. The UE can initiate AR and send it to the other Scell/S-TRPs based on its measurement on the targets and the source. The second (or other) target S-TRP can also initiate activation and send AR to the UE In an aspect, for delay sensitive information to be exchanged between source and target with long backhaul delay, UE path can be an alternative. Pre-allocate access resource for UE to initiate its transmission for relaying the information. Limited information such as "activation indication" can be delivered implicitly by dedicated access preamble. In an aspect, pre-allocate PUSCH resources associated with the pre-allocated access resource. For example, fixed time slots after the access preamble transmission can be pre-determined for the transmission of the follow up PUSCH resources. The time and frequency of the PUSCH are further pre-specified. The pre-allocated resources are known to both the UE and the receiving side of the gNB/TRP.

In an embodiment, a method in a network component for handover of a user equipment (UE) includes configuring, by the network component, at least one target secondary serving transmission reception point (TRP) determined according to UE mobility information. Configuring the at least one target secondary serving TRP is performed prior to the UE moving into a border area between the at least one target secondary serving TRP and a first TRP (i.e., a source TRP). Configuring that at least one target TRP results in the at least one target TRP being configured to act as a second serving TRP to the UE, configuring at least one target TRP and the UE with a corresponding dedicated access resource, and providing monitoring opportunities to the at least one target TRP and UE. The method also includes activating a connection and data communication between the UE and at least one pre-configured target secondary serving TRP.

In an embodiment, a method in a transmission reception point (TRP) includes receiving, at the TRP, configuration information prior to a user equipment being within a coverage area of the TRP. The configuration information causes the TRP to allocate resources to serve the UE and become a secondary TRP in a Dual Connectivity (DC) structure. The configuration information allows the TRP to allocate dedicated access resources to the UE for it to initiate or relay an activation request. The configuration information configures monitor opportunities between the TRP and the UE. The configuration procedure uses at least one S-TRP addition request acknowledgement message and a Radio Resource Control (RRC) Connection Reconfiguration message assigning at least a C-RNTI, a CORESET, and a PDCCH associated with the TRP to the UE and the TRP identified as a target TRP by a network component according to mobility information of the UE. The method also includes activating the connection and data communication between the secondary TRP and the UE according to an activation event.

In an embodiment, a method in a user equipment (UE) includes receiving, at the UE, an identification of one or more target transmission reception points (TRPs) from a source TRP before the UE is within a coverage area of any of the one or more target TRPs. The one or more target TRPs are identified according to UE mobility information. The method also includes receiving dedicated access resources allocated at the target TRP(s) or at the source TRP for the UE to initiate or relay an activation request to the target TRP or an activation notification to the source TRP. The method also includes accepting configuration of monitor opportunities between the target TRP(s) and the UE. The method also includes receiving the configuration of a Radio Resource Control (RRC) Connection Reconfiguration message carrying at least a C-RNTI, a CORESET, and a PDCCH associated with the target TRP(s). The method also includes activating a secondary TRP from one of the one or more target TRPs to communicate with the UE according to an activation event.

In an embodiment, a network node in a wireless network includes a processor and a computer readable storage medium storing programming for execution by the processor. The programming includes instructions to configure at least one target transmission reception point (TRP) determined according to UE mobility information. Configuring the at least one target TRP is performed prior to the UE moving into a border area between the at least one target TRP and a first serving TRP. The configuring the at least one target TRP results in the at least one target TRP being configured to act as a secondary (serving) TRP to the UE. The configuring also provides at least one target TRP and the UE with a corresponding dedicated access resource and monitoring opportunities. The programming also includes instructions to activate the communications of the UE to the at least one target TRP.

In an embodiment, a transmission reception point (TRP) in a wireless network includes a processor and a computer readable storage medium storing programming for execution by the processor. The programming includes instructions to receive configuration information prior to a user equipment (UE) being within a coverage area of the TRP. The configuration information causes the TRP to allocate resources to serve the UE and become a secondary TRP. The TRP is identified as a target TRP by a network component according to mobility information of the UE. The configuration information allows the TRP to allocate dedicated access resources to the UE for the UE to initiate or relay an activation request. The configuration information also configures monitor opportunities between the TRP and the UE. The configuration procedure uses at least one S-TRP addition request acknowledgement message and a Radio Resource Control (RRC) Connection Reconfiguration message to assign at least a C-RNTI, a CORESET, and a PDCCH associated with the TRP to the UE. The programming also includes instructions to activate the TRP to become a serving TRP to the UE according to an activation event.

In an embodiment, a user equipment (UE) in a wireless network includes a processor and a computer readable storage medium storing programming for execution by the processor. The programming includes instructions to receive an identification of one or more target transmission reception points (TRPs) from a source TRP before the UE is within a coverage area of any of the one or more target TRPs. The one or more target TRPs is identified according to UE mobility information. The programming also include instructions to receive dedicated access resources allocated at the target TRP(s) or the source TRP for the UE to initiate or relay an activation request to the target TRP or the activation notification to the source TRP. The programming also includes instructions to accept configuration of monitor opportunities between the target TRP(s) and the UE and to receive the configuration of a Radio Resource Control (RRC) Connection Reconfiguration message carrying at least a C-RNTI, a CORESET, and a PDCCH associated with the target TRP(s). The programming also includes instructions to activate a connection and communication to one of the one or more target TRPs according to an activation event.

In one or more aspect, the configuring at least one target TRP includes configuring a plurality of target TRPs to be the secondary TRPs and the activating (the connection to) one of the plurality of the secondary serving TRPs.

In one or more aspect, the UE mobility information includes one of UE travel route, UE location, UE speed, and UE location history.

In one or more aspect, activating the secondary TRP includes a target TRP initiated activation.

In one or more aspect, activating the secondary TRP includes a UE initiated activation.

In one or more aspect, the activating is initiated according to a secondary TRP activation criteria.

In one or more aspect, a target secondary TRP activation criteria includes a corresponding UE's Uplink signal quality is above a threshold for a target TRP initiated activation, a target signal quality is above a threshold and/or a source signal quality is below a threshold for a UE initiated activation.

In one or more aspect, the activation is initiated according to receipt of a signal from one of the UE and the at least one target TRP.

In one or more aspect, the activation is notified according to receipt of a signal that is signaled to the network component via backhaul signaling from the target TRP.

In one or more aspect, the configuring the at least one target TRP is performed prior to the UE obtaining a reliable measurement on the target TRP.

In one or more aspect, the method further includes pre-configuring and using a dedicated access resource for the UE to relay an activation indication to one of a source TRP and one of the target secondary TRPs.

In one or more aspect, the method further includes pre-configuring and using one or more monitor opportunities between the one of the target secondary TRPs and the UE for the one of the target secondary TRPS to send an activation notification to the UE.

In one or more aspect, the method further includes pre-configuring at least one of a S-TRP addition request acknowledgement message and a Radio Resource Control (RRC) Connection Reconfiguration message at assign at least a C-RNTI, a CORESET, and a Physical Downlink Control Channel (PDCCH) associated with one of the target secondary TRPs to the UE.

In one or more aspect, an activation trigger at the target secondary TRP is based on a measurement of the UE's uplink reference signals.

In one or more aspect, the activation event includes an activation initiated by an uplink measurement of the corresponding UE above a threshold at the TRP.

In one or more aspect, an activation notification is transmitted at a time slot defined in pre-configured monitor opportunities.

In one or more aspect, an activation notification is transmitted through PDCCH addressed to the C-RNTI assigned to the UE.

In one or more aspect, an activation notification is transmitted through a backhaul to a source TRP.

In one or more aspect, wherein the activation event includes receiving an activation request from one of the UE and a source TRP.

In one or more aspect, the activation request is detected and received from a pre-allocated dedicated access resource to the UE.

In one or more aspect, further comprising monitoring wireless signals to determine if the UE is within the coverage area of the TRP, wherein activating the TRP for data communication according to a measurement of an uplink reference signal from the UE.

In one or more aspect, the activation event includes a signal received from one of the source TRP and one of the one or more target TRPs.

In one or more aspect, the activation event includes a determination that a signal measurement of a signal from one of the one or more target TRPs exceeds a threshold.

In one or more aspect, the activation event includes a determination that a signal measurement from the source TRP is below a threshold.

In one or more aspect, the activation event triggers the UE initiating or relaying the activation request to the target TRP, or relaying the activation notification to the source TRP via pre-allocated access resources respectively.

In one or more aspect, monitoring the PDCCH or time slots of monitor opportunities to receive the activation notification from the target TRP.

In one or more aspect, the method further includes receiving an identification of an order in which the one or more target secondary TRPs are to become a serving TRP.

FIG. 1 shows an embodiment of a network 100. Network 100 includes a plurality of central units (CUs) 104, 106 and a plurality of distributed units (DUs) 102, 108. The CUs 104, 106 and DUs 102, 108 are connected by a backhaul network 118. Network 100 is an example of a new radio (NR) CU/DU/transmission reception point (TRP) hierarchical architecture. In an aspect of the disclosure, there are multiple DUs 102, 108 under a CU 104, 106. Each DU 102, 108 communicates with and controls one or more TRPs. For example, DU2 108 controls TRP 116. Each TRP has a corresponding coverage area 112, 114 in which it provides network access to a UE 110. Adjacent TRPs may have an overlapping coverage area 122. In an aspect, a DU is equivalent to a next generation nodeB (gNB) connecting many TRPs under it. The DUs 102, 108 and the CUs 104, 106 are connected by a backhaul 118. The backhaul 118 between the CUs 104, 106 is an Xn connection. In an aspect, the Xn connection is only between the CUs 104, 106.

Due to the hierarchical architecture of the NR, a large latency may be introduced by a long backhaul 118. In fact, the backhaul can be very long and the delay between two TRPs of different CUs 104, 106 can be excessive. Normally, in the prior art, cross CU handovers (HOs) require a large amount of signaling exchanges over the backhaul 118. In the HO procedure, there is a significant amount of signaling exchanges between the source and target nodes over the backhaul 118 which causes a large latency to be accumulated. If these signaling exchange steps are on the time critical path of the HO, a large HO latency will cause the over-the-air signaling exchange to be performed under a significant degraded link condition at the source due to the UE 110 traveling away from the source node towards the target node. The degraded link condition between the source and the UE leads to increased HO failure rate and performance degradation. As a result, the NR Ultra-Reliable Low-Latency Communications (URLLC) requirements cannot be met.

Figure 2:
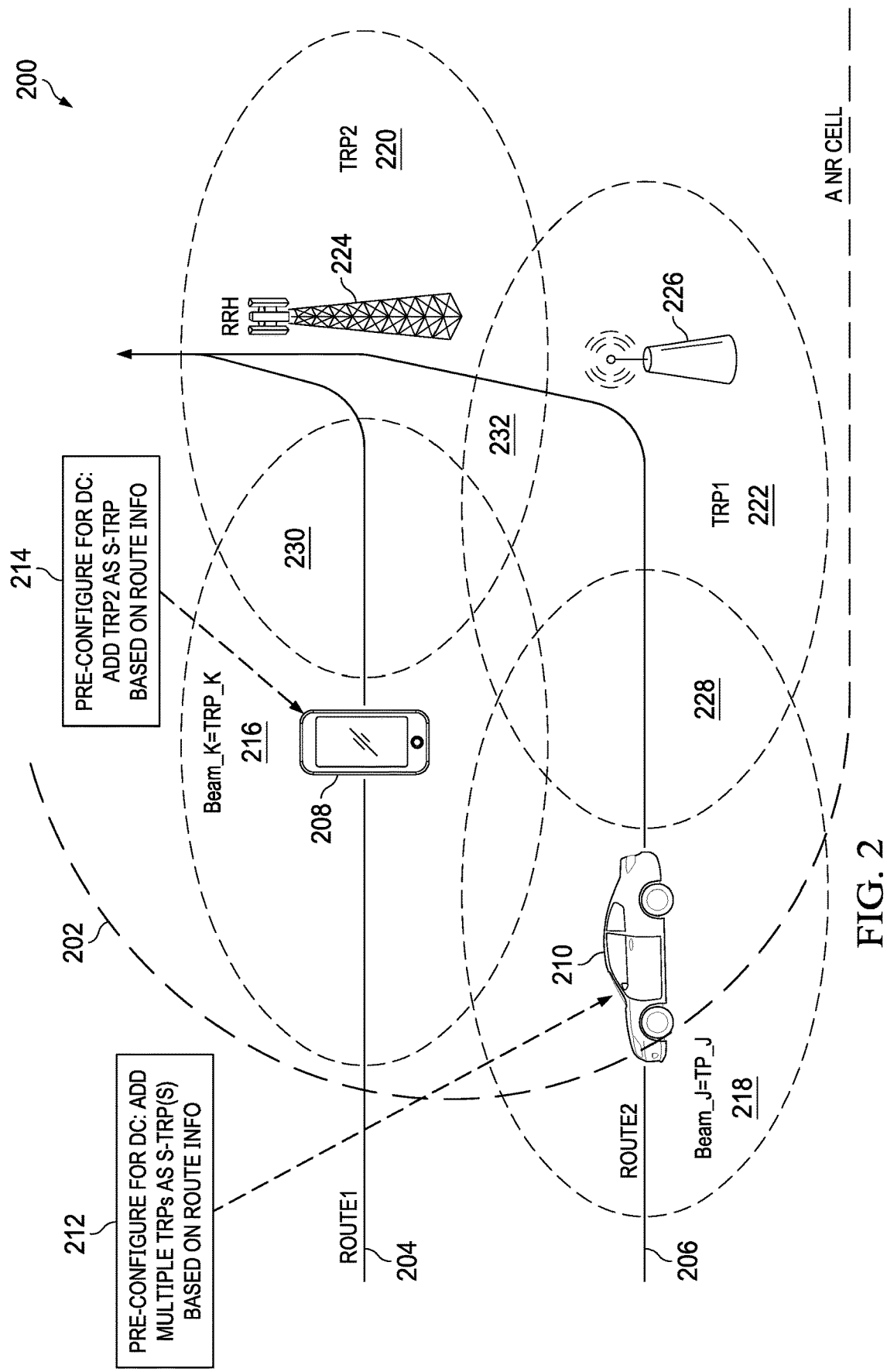
FIG. 2 shows an embodiment of a network for pre-configuring or pre-adding at least one target SgNB/S-TRP for DC based HO based on trip route information of a UE even before the UE has reliable measurement on the target(s)

FIG. 2 shows an embodiment of a network 200 for pre-configuring or pre-adding at least one target SgNB/S-TRP for DC based HO based on trip route information of a UE even before the UE has reliable measurement on the target(s). Network 200 includes a NR cell 202 that includes multiple TRPs 224, 226 (not all TRPs shown) each with a respective coverage area 216, 218, 220, 222. Coverage areas 216, 218, 220, 222 between adjacent TRPs may overlap in overlapping zones 228, 230, 232. The network 200 also includes UE 208 traveling along route 1 204 and a UE 206 traveling along route 2 206. In order to facilitate handover and reduce the potential for HO failure due to backhaul delays, a source TRP may determine and configure potential target TRPs for each UE 208, 210 according to the projected route information for each UE 208, 210. For example, remote radio head (RRH) 224 for TRP2 is pre-configured for UE 208 based on UE's 208 projected route 204. In an aspect, multiple TRPs may be pre-configured for a UE. In the depicted example, a source TRP determines and pre-configures TRP1 226 and RRH 224 corresponding to TRP2 for UE 210 based on the projected route 206 of UE 210. It may be beneficial to pre-configure multiple target TRPs for UEs traveling at high speeds.

By determining and pre-configuring a target TRP before a UE has measured a signal from the target TRP and before a channel between the source TRP and the UE has degraded, the potential for HO failure due to backhaul delays may be reduced. In an aspect, most signalling exchanges steps of HO are moved out of time critical path by pre-configuring multi-cells/TRPs as HO target cells/TRPs. By doing this, HO reliability can be largely improved, especially for the high speed UEs. However, pre-configuring a large number of target cells/TRPs will take a lot of resources and may not be feasible. Therefore, in an aspect, to save the resources, side information including travel route, UE location, UE speed, etc. is used to determine at least a next immediate HO target, or also an additional few following cells/TRPs on the route, to be HO targets.

Currently, for more and more trips, their routes are predetermined by using trip applications such as Google™ maps, especially for rapidly increased self-driving/moving devices. A list of TRPs on the trip route with an order of entering each TRP (the trip route may be a complete listing of the traveling direction information) can be determined or known by the network. Entering the cells/TRPs on the pre-determined route is deterministic; thus, the reliability of HO target decisions based on the trip route information may be greater than the reliability of conventional HO target decisions determined by measurement of signals between the TRPs and the UE. In an aspect, the target cells/TRPs will change only when the route is changed. In an aspect, if that happens due to travel plan change, the network will be updated immediately. It is beneficial to determine and pre-allocate potential target TRPs to reduce the HO latency and signaling on the time critical path. Therefore, the HO failure rate is reduced by pre-configuring multiple TRPs on the planned traveling route especially for high speed UEs. Pre-configuration can be conducted before the UE moves into the coverage border area. At the time the UE moves into border area, the pre-configured S-TRP can be activated with much less latency and signaling. Furthermore, most of the HO signaling exchanges may be performed when the UE still has a very good connection with the source gNB/TRP. Accordingly, HO failure rate is largely reduced.

Figure 3:
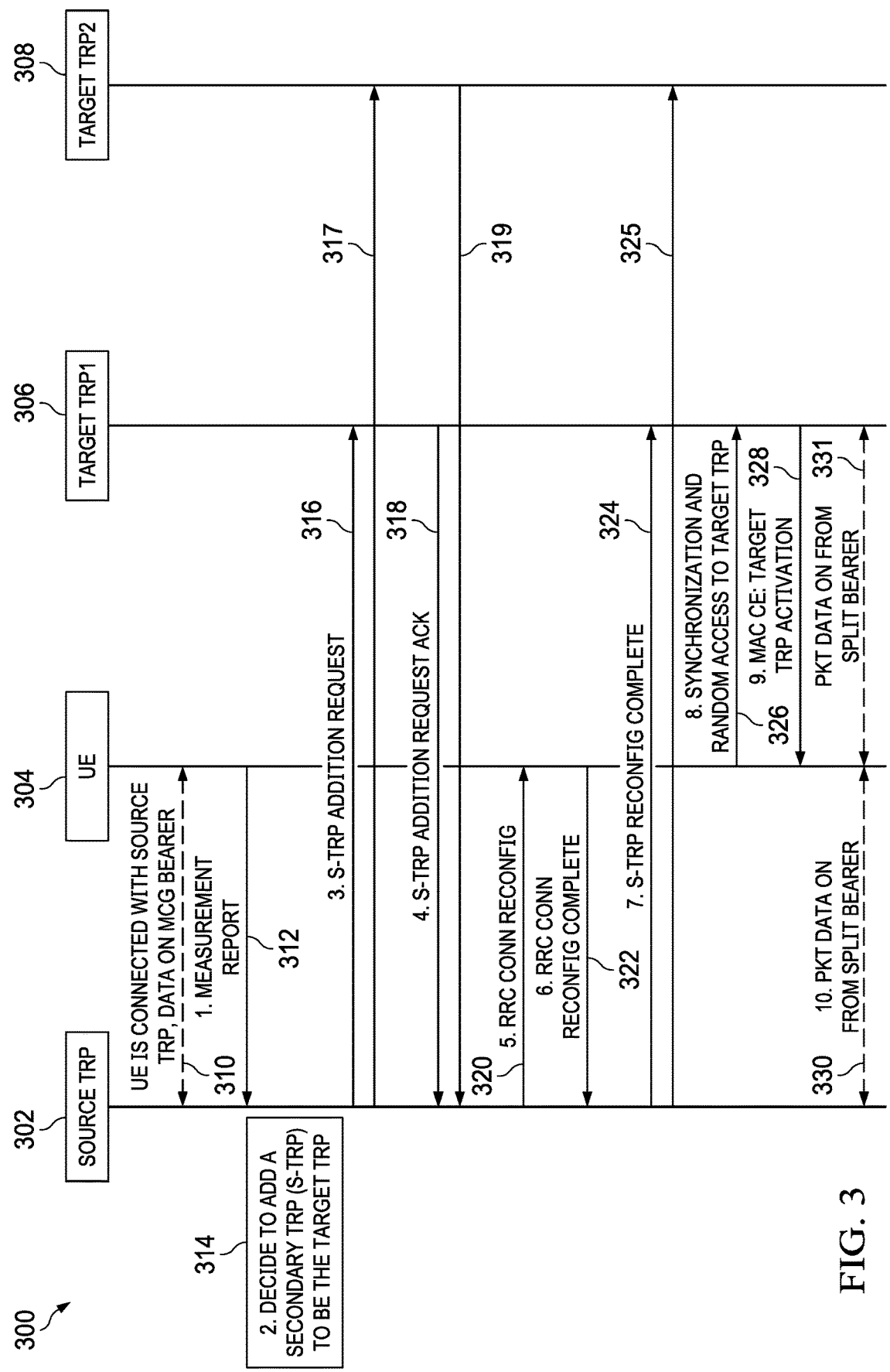
FIG. 3 shows a flowchart of an embodiment of a method for handover of a UE in a wireless network with pre-configuration of a target TRP and a potential target TRP.

FIG. 3 shows a flowchart of an embodiment of a method 300 for handover of a UE 304 in a wireless network with pre-configuration of a target TRP 306 and a potential target TRP 308. The pre-configuration can be conducted for an immediate target and one or more potential target gNBs/TRPs based on the UE route information. In an aspect, the pre-configuration can be done well before the UE moves into the border area between the source TRP and the target TRP, before the UE has reliable measurements on the target gNB/TRP, and before the RF condition of the connection with the source cell has been degraded. In an aspect, the pre-configuration includes configuring the potential target gNBs/TRPs as SgNBs/S-TRPs at both the target(s) and the UE, pre-allocating/assigning resources for future SgNB/S-TRP activation via UE, and pre-configuring the UE with monitoring opportunities corresponding to each potential target cell. More specifically, for each target, the periodicity of one or more possible downlink (DL) signal opportunities can be pre-configured at both the UE and the target gNB(s)/TRP(s). In an aspect, each pre-configured target gNB/TRP knows the time slot corresponding to itself and the periodicity of the time slots at which the UE will start to monitor. In an aspect, when triggered, a target gNB/TRP only sends the activation notification on its own pre-assigned time slot. Additionally, in an aspect, the UE only monitors the target on the pre-configured time slot. In an aspect, the pre-configuration also assigns to the UE the C-RNTI, CORESET and PDCCH associated with the target DU/TRP.

In an aspect, the method 300 begins at step 310 with the UE 304 connected to the source TRP 302 with data exchanged on an MCG bearer. At step 312, the UE 304 sends a measurement report to the source TRP 302. At step 314, the source TRP 302 decides to add a secondary TRP (S-TRP) to be the target TRP. At steps 316, 317, the source TRP 302 sends an S-TRP addition request to target TRP1 306 and target TRP2 308. At steps 318,319, the target TRP1 306 and the target TRP2 308 send an S-TRP addition request acknowledgement (ACK) to the source TRP 302. At step 320, the source TRP 302 sends a radio resource control (RRC) connect reconfiguration message to the UE 304. At step 322, the UE 304 sends an RRC connect reconfiguration complete message to the source TRP 302. At steps 324, 325, the source TRP 302 sends S-TRP reconfiguration complete messages to the target TRP1 306 and the target TRP2 308. In an aspect, the signaling between the source TRP 302 and the target TRP1 306 and the target TRPs 308 in steps 316, 317, 324, 325 are signaled via Xn over the backhaul. At step 326, the target TRP1 306 sends a synchronization and random access to target TRP to the UE 304. At step 328, the target TRP1 306 sends a medium access control (MAC) control element (CE) message to the UE 304 activating the target TRP1 306 as the new serving TRP. At step 330, the UE 304 exchanges packet data from split bearer with the source TRP 302. At step 331, the UE 304 exchanges packet data from split bearer with the target TRP1 306.

In an aspect, for pre-configuration, only signaling steps 312, 314, 316, 317, 318, 319, 320, 322, 324, 325 are of concern. In the case where multiple TRPs are pre-configured, multiple S-TRP addition requests, target autonomous-activation monitoring opportunity (periodicity, time slot corresponding to each target if applicable) are sent to target TRPs at steps 316, 317. In an aspect, at steps 318, 319, the S-TRP Addition Request ACK message carries pre-assigned resources for future S-TRP activation via UE 304 rather than the backhaul if the backhaul delay is too long. The backhaul delay can be measured and is fixed after the deployment. The determination of how much delay is too long may be implementation dependent.

In an aspect, at step 320, the RRC Connection Reconfiguration message contains information for both target TRP1 306 and target TRP2 308 to pre-configure the UE. In an aspect, the information includes the pre-allocated dedicated resources corresponding to each target TRP 306, 308 to support Dual Connectivity (DC) activation via UE, and target monitoring opportunity (e.g., periodicity, time slot corresponding to each target) of all the targets 306, 308 to support target autonomous activation.

In an aspect, in an NR strictly synchronized coverage area (e.g., in any location of the area where the offset of reference signals from different TRPs/Cells is within CP), step 326 of synchronization and RA can be skipped.

In an aspect, after pre-configuration, when the UE 304 moves across the border area of the source and target DU/TRP (e.g., source TRP 302 and target TRP1 306), DC based HO only involves a DU to secondary gNB (SgNB)/secondary TRP (S-TRP) activation process at the MAC layer. In various aspects, the SgNB/S-TRP activation may be initiated from either the source or target DU/TRP. The UE will take action upon received the SgNB/S-TRP activation MAC CE no matter whether it is initiated from the source or target DU/TRP. If the target SgNB/S-TRP activation is initiated by the source DU/TRP (Master gNB/Master TRP: MgNB/M-TRP), the activation request is sent to the SgNB/S-TPR via backhaul (if the backhaul delay is short) or via the UE (if the backhaul delay is long). If the target SgNB/S-TRP activation is initiated by the target itself based on its own knowledge on the UE (e.g. based on its UL measurement on the UE and other side information), the activation request is sent to the source MgNB/M-TRP via backhaul (if the backhaul delay is short) or via the UE (if the backhaul delay is long). This will avoid the delay introduced by the UE measurement report for the activation triggering at the MgNB/M-TRP. As a result, the method 300 will largely improve the UE HO reliability, minimize HO delay, and help ensure the network controllability on the UEs.

Figure 4:
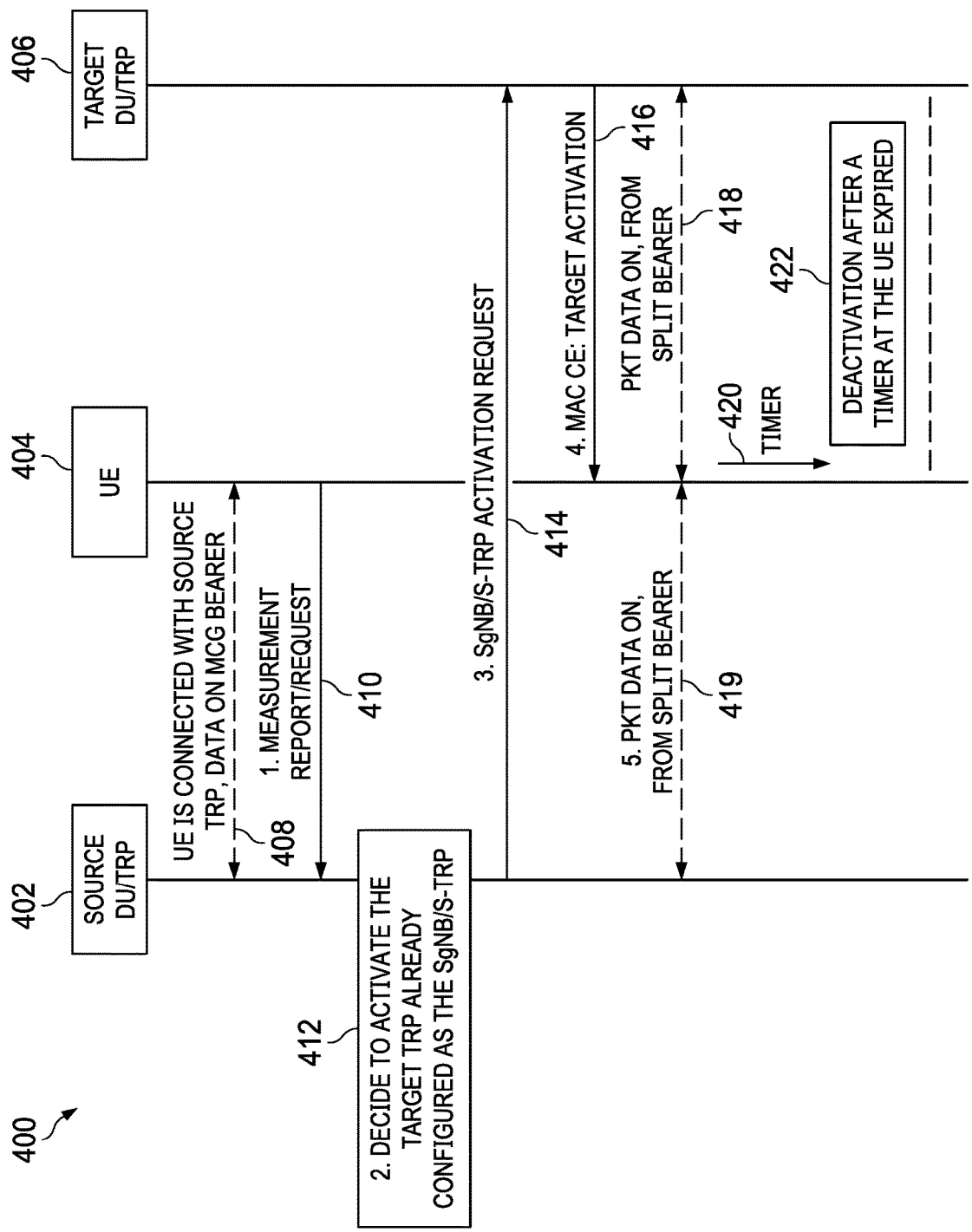
FIG. 4 shows a flowchart of an embodiment of a method for handover of a UE in a wireless network with pre-configuration of a target TRP.

FIG. 4 shows a flowchart of an embodiment of a method 400 for handover of a UE 404 in a wireless network with pre-configuration of a target TRP 406. The method 400 begins at step 408 where the UE 404 is connected with the source DU/TRP 402 and data is exchanged between the UE 404 and the source DU/TRP 402 on the MCG bearer. At step 410, the UE 404 sends a measurement report/request to the source DU/TRP 402. At step 412, the source DU/TRP 402 decides to activate the target DU/TRP 406 that has already been configured as the SgNB/S-TRP. At step 414, the source DU/TRP 402 sends a SgNB/S-TRP activation request to the target DU/TRP 406. In an aspect, step 414 is signaled via Xn, which may introduce a large delay. At step 416, the target DU/TRP 406 sends a MAC CE for target activation to the UE 404. Under tightly synchronized scenario, at step 418, packet data is exchanged between the UE 404 and the target DU/TRP 406 from split bearer and, at step 419, packet data is exchanged between the UE 404 and the source DU/TRP 402 from a split bearer. If the tight synchronization condition is not met, the UE will start random access to the target. After the random access is successfully completed, the data transmissions between the UE and the target starts. For simplicity and to focus on the disclosure, the following descriptions are under the tight synchronization scenario without losing the generality. At step 422, the source DU/TRP 402 is deactivated after a timer 420 at the UE 404 has expired.

In an aspect, after pre-configuration, when the UE 404 moves across the border area of the source DU/TRP 402 and the target DU/TRP 406, DC based HO only involves the SgNB/S-TRP activation process with step 414 and 416 if a strict synchronization condition is met. The latency and signalling of activation only are much less than that of the complete configuration delay plus activation process. In an aspect, if the backhaul delay is small, step 414 performed over the backhaul is favourable. If the physical connection between the source DU/TRP 402 and the target DU/TRP(s) 406 is long, the delay of step 414 may still not be tolerable for certain high mobility UEs (e.g., UE 404) with a URLLC requirement.

Figure 5:
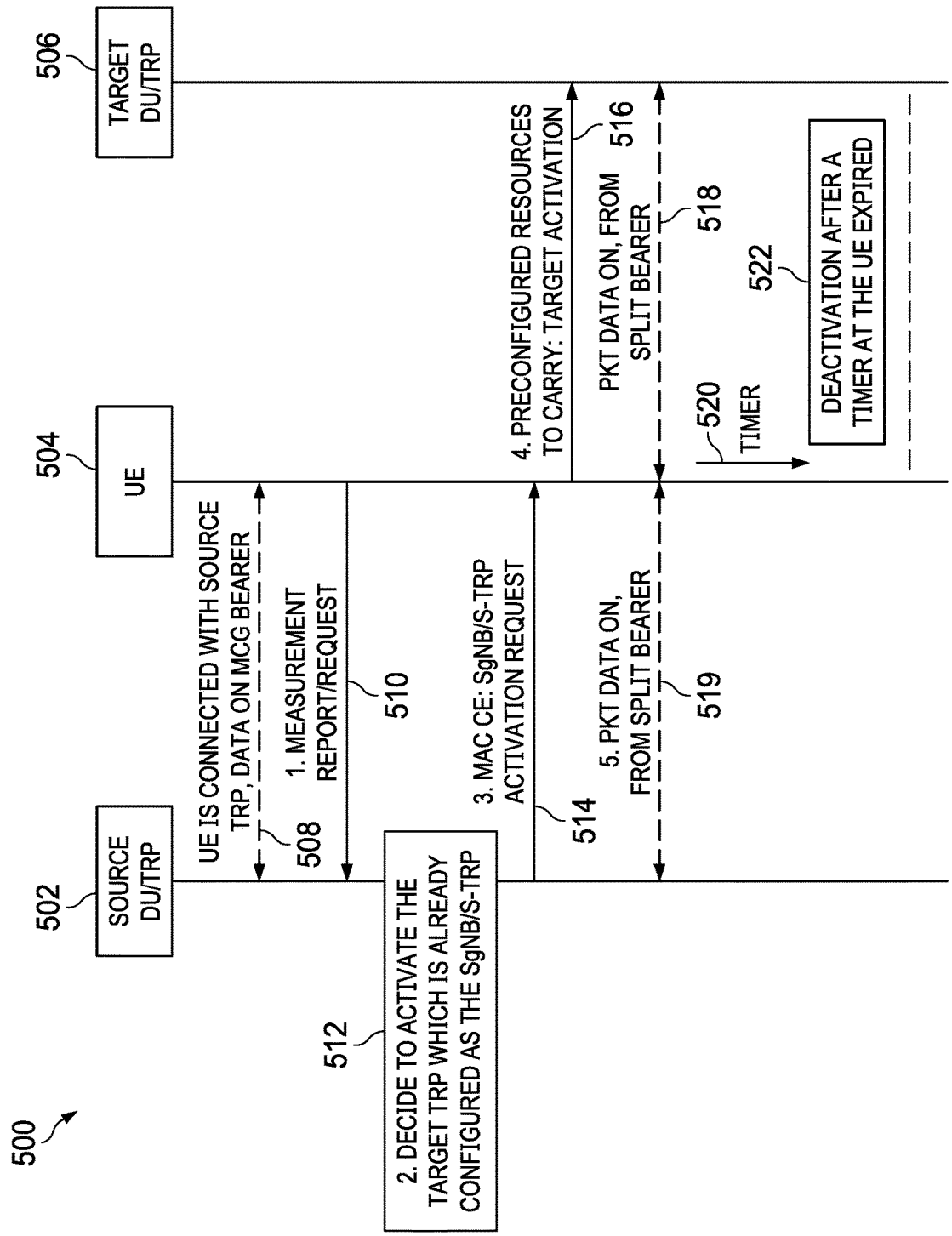
FIG. 5 shows a flowchart of an embodiment of a method for handover of a UE in a wireless network with pre-configuration of a target DU/TRP.

FIG. 5 shows a flowchart of an embodiment of a method 500 for handover of a UE 504 in a wireless network with pre-configuration of a target DU/TRP 506. The method 500 begins at step 508 where the UE 504 is connected with the source DU/TRP 5 report/request to the source DU/TRP 502. At step 512, the source DU/TRP 502 decides to activate the target TRP which is already configured as the SgNB/S-TRP. At step 514, the source DU/TRP 502 sends a MAC CE SgNB/S-TRP activation request to the UE 504. At step 516, the UE 504 sends a message to the target DU/TRP 506 with information indicating preconfigured resources to carry and a target activation indicator. At step 518, packet data is exchanged between the UE 504 and the target DU/TRP 506 from split bearer and, at step 519, packet data is exchanged between the UE 504 and the source DU/TRP 502 from a split bearer. At step 522, the source DU/TRP 502 is deactivated after an internal timer in synchronized with the timer 520 at the UE 504 has expired.

In an aspect, the Source DU/TRP 502 sends SgNB/S-TRP activation request to the target DU/TRP 506 via the UE 504 which can be an alternative to doing so over the backhaul in order to avoid Xn backhaul delay. In an aspect, the radio propagation delay from source DU/TRP 502 to the UE 504 and from the UE 504 to the target DU/TRP 506 may be minimal due to high frequency/small coverage. The UE-path delay is driven by UE receive (RX)/transmit (TX) processing delay, which can be a few transmission time intervals (TTIs) (e.g., less than 1 millisecond (ms)). In an aspect, at step 514, the source DU/TRP 502 sends the S-TRP activation request as an MAC CE to the UE 504. The UE 504 uses the dedicated resources (e.g., access or PUSCH) allocated during the pre-configuration phase to deliver the activation request message (grant free) to the target DU/TRP 506. In general, any delay sensitive control/report information exchange between source DU/TRP 502 and target DU/TRP 506 can be carried via the UE 504 if the backhaul delay is not tolerable and much longer than the UE 504 processing delay.

Figure 6:
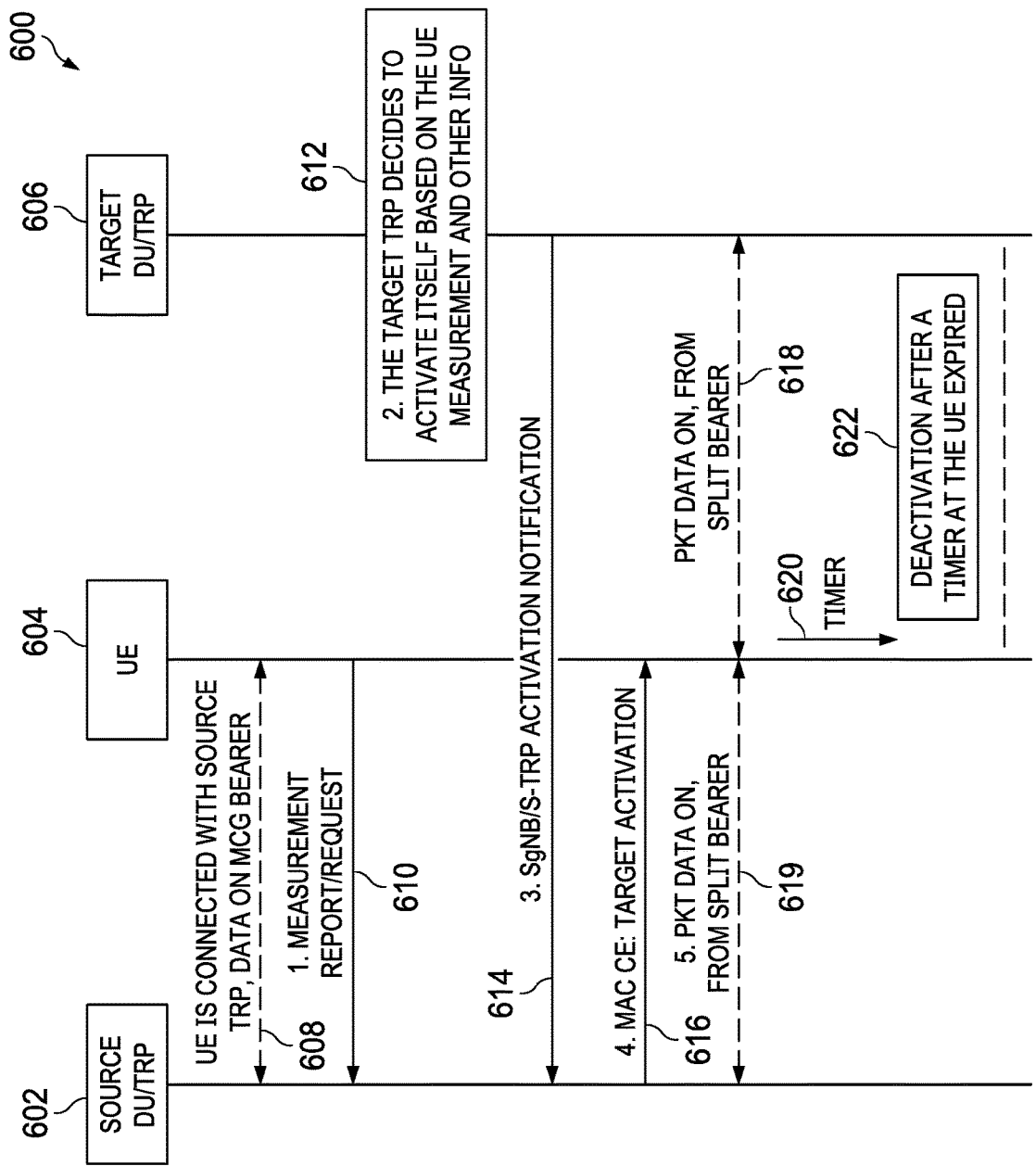
FIG. 6 shows a flowchart of an embodiment of a method for handover of a UE in a wireless network with pre-configuration of a target DU/TRP.

FIG. 6 shows a flowchart of an embodiment of a method 600 for handover of a UE 604 in a wireless network with pre-configuration of a target DU/TRP 606. The method 600 begins at step 608 where the UE 604 is connected with the source DU/TRP 602 with data exchanged on the MCG bearer. At step 610, the UE 604 sends a measurement report/request to the source DU/TRP 602 as usual. At step 612, the target DU/TRP 606 decides to activate itself based on the UE measurement and, optionally, other information. At step 614, the target DU/TRP 606 sends a SgNB/S-TRP activation notification to the source DU/TRP 602. In an aspect, the signaling at step 614 is sent (at least partially) via Xn backhaul. At step 616, the source DU/TRP 602 sends a MAC CE target activation message to the UE 604. At step 618, packet data is exchanged between the UE 604 and the target DU/TRP 606 from split bearer and, at step 619, packet data is exchanged between the UE 604 and the source DU/TRP 602 from a split bearer. At step 622, the source DU/TRP 602 is deactivated after an internal timer in synchronized with the timer 620 at the UE 604 has expired.

After pre-configuration, the target DU/TRP 606 is aware of the UE 604, for example the configuration of the UE's reference signal (LTE Sounding Reference Signal (SRS) like) transmitted periodically is known by the target DU/TRP after the pre-configuration. Therefore, the target DU/TRP 606 can continue to search and detect the UE's UL reference signal and based on the measurement initiate the target activation by itself and notify the source DU/TRP 602 and the UE 604. The target DU/TRP 606 can also initiate the DC activation based on in addition to its own UL measurement on the UE 604 and optionally, other information, such as, for example, the current load of the target DU/TRP 606. In an aspect, the activation notification can be sent over the backhaul if the backhaul delay is small. In this case, the source DU/TRP 602 sends the target activation MAC CE to the UE 604.

Figure 7:
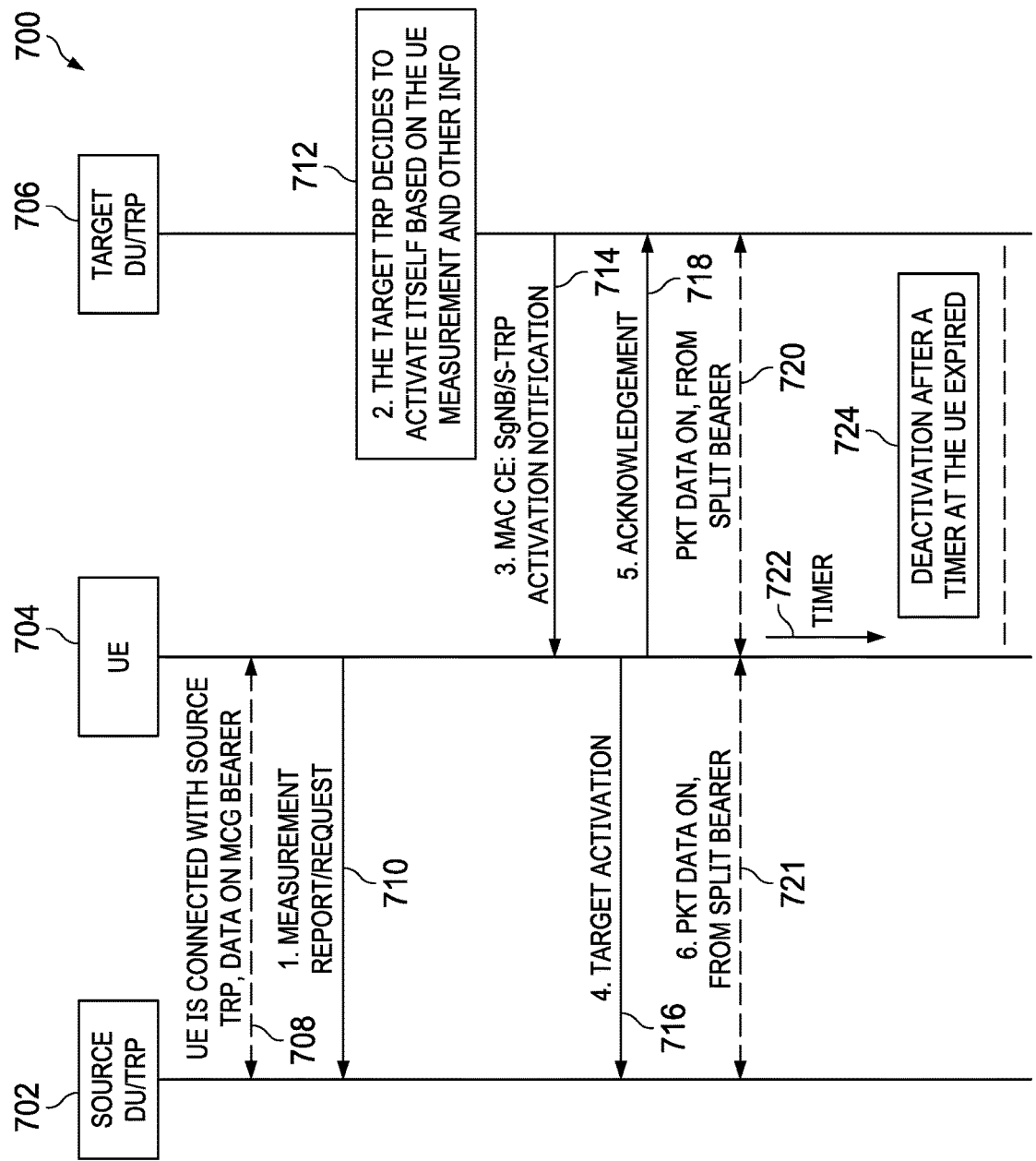
FIG. 7 shows a flowchart of an embodiment of a method for handover of a UE in a wireless network with pre-configuration of a target DU/TRP.

FIG. 7 shows a flowchart of an embodiment of a method 700 for handover of a UE 704 in a wireless network with pre-configuration of a target DU/TRP 706. The method 700 begins at step 708 where the UE 704 is connected with the source DU/TRP 702 with data exchanged on the MCG bearer. At step 710, the UE 704 sends a measurement report/request to the source DU/TRP 702. At step 712, the target DU/TRP 706 decides to activate itself based on the UE measurement and, optionally, other information. At step 714, the target DU/TRP 706 sends a SgNB/S-TRP activation notification via a MAC CE message to the source UE 704. At step 716, the UE 704 sends a target activation message to the source DU/TRP 702 indicating that the target DU/TRP connection has been activated. At step 718, the UE 704 sends an acknowledgement 718 to the target DU/TRP 706 (This is under the tightly synchronized scenario. Otherwise, the UE starts the random access to the target S-TRP). At step 720, packet data is exchanged between the UE 704 and the target DU/TRP 706 from split bearer and, at step 721, packet data is exchanged between the UE 704 and the source DU/TRP 702 from a split bearer. At step 724, the source DU/TRP 702 is deactivated after an internal timer in synchronized with the timer 722 at the UE 704 has expired.

Thus, after the target DU/TRP 706 is preconfigured with the UE 704, the target DU/TRP 706 monitors and measure the UE's 704 UL reference signal (e.g., like an SRS in LTE). If the UL measurement is above a quality threshold, the DU/TRP 706 considers that a reliable TX/RX with the UE 704 can be supported. Then the DU/TRP 706 sends notifications to both the source DU/TRP 702 and the UE 704 (as shown in the flow chart steps 714, 716) and activates the second leg. Similar to the source triggered activation shown in FIG. 4, 5, the target autonomous activation also notifies all the parties (i.e., the source DU/TRP 702 and the UE 704).

In an aspect, for the target autonomous activation, a normal synchronized network is assumed. The synchronization and access can be performed in a similar manner as to the procedure performed after a UE receives an HO command in prior art HO procedure.

In an aspect, route information based pre-configuration can be done for one target or for multiple targets. When multiple targets are pre-configured, based on the route information, the UE knows the order of the targets to enter and the cell ID of the first immediate target. Therefore in either case, the UE will start to search/detect the cell ID associated SSB (SS-Block is the reference signal associated with the cell ID in NR) of its immediate target right after the pre-configuration is completed. After the UE acquired the SSB, the UE will synchronize and track with the SSB. After the UE synchronizes with the target SSB, the UE starts to monitor the pre-configured time slot(s) corresponding to the target SgNB/S-TRP. When the pre-configured target TRPs are very close, the UE can synch up with the multiple SSBs of the TRPs and monitor the time slots corresponding to multiple target TRPs. When a target node triggers the autonomous Dual Connectivity (DC) activation, the target sends the activation notification on its associated time slot. The network can coordinate the autonomous activation from the multiple preconfigured targets. Multiple activation notifications can be sent in the same monitoring cycle from the target nodes in a manner similar to the paging in order to capture the fast moving UE. In an aspect, this is limited to the inter-cell HO case. In another aspect, in a tight synchronized scenario, the UE monitors the CORESET of the PDCCH of the target TRP and uses the C-RNTI to decode the activation instruction from the target to the UE.

In an aspect, the target SgNB/S-TRP 706 sends an autonomous activation notification to the source DU/TRP 702 via the UE 704. As is shown in FIG. 7, the target node sends the notification to the UE first. The UE 704 relays the activation notification to the source DU/TRP 702 and sends back an acknowledgement to the target DU/TRP 706. In an aspect, this is for the case of when strict synchronization requirement is met. Otherwise, in another aspect, the UE 704 performs random access to the target DU/TRP 706.

In an aspect, dedicated RACH resources are pre-allocated for this purpose of the UE relaying the activation indication to the source during the pre-configuration. This approach may be preferred when the backhaul delay is large.

Figure 8:
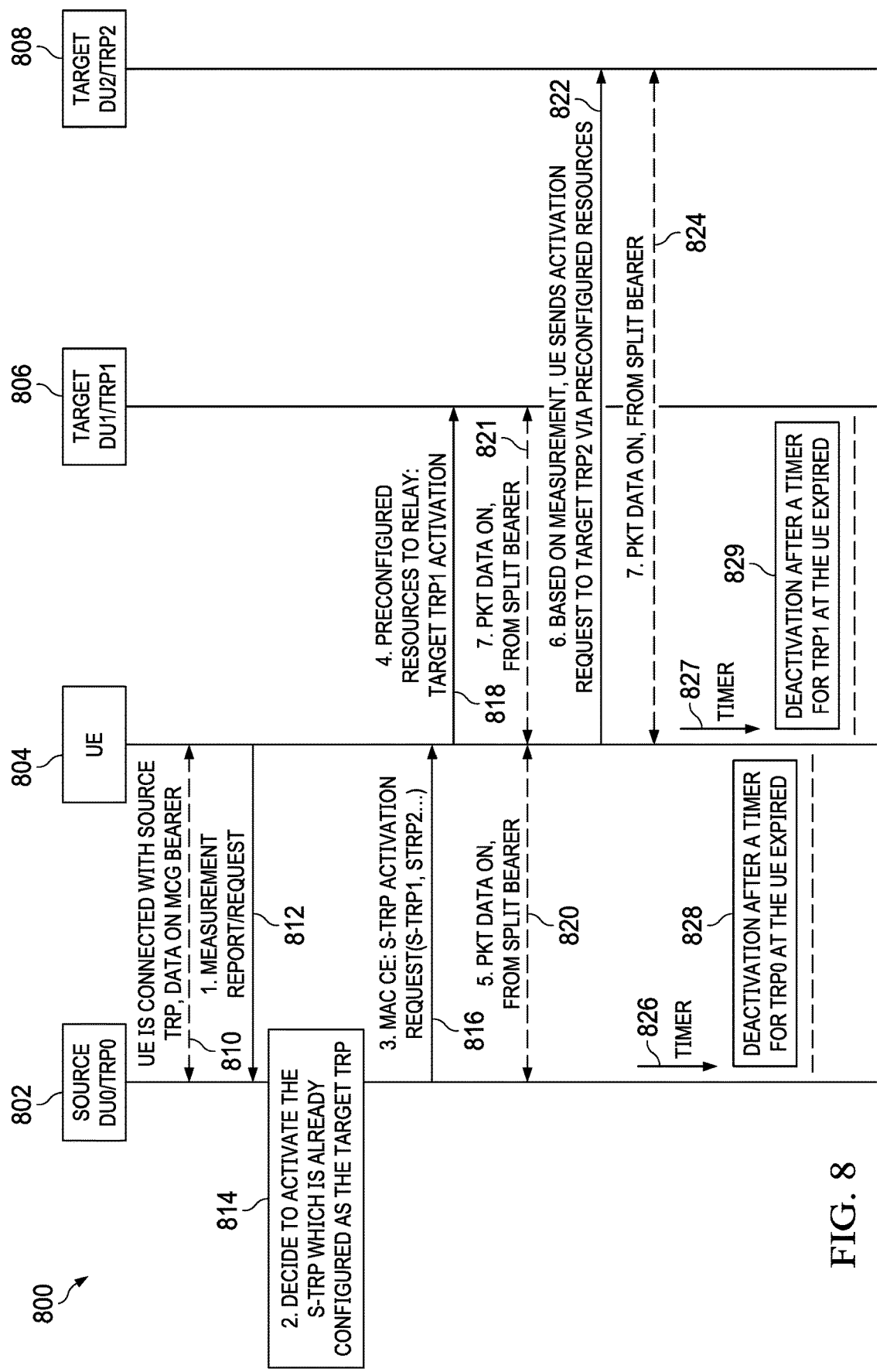
FIG. 8 shows a flowchart of an embodiment of a method for handover of a UE in a wireless network with pre-configuration of multiple target DUs/TRPs.

FIG. 8 shows a flowchart of an embodiment of a method 800 for handover of a UE 804 in a wireless network with pre-configuration of multiple target DUs/TRPs 806, 808. If the UE 804 is moving very fast, a few pre-configured potential target DUs/TRPs 806, 808 are very close with small coverage, and all the DUs/TRPs 806, 808 meet strict synchronization requirements, the S-TRP activation request from the source DU/TRP 802 can contain more than one pre-configured target DU/TRP 806, 808. The method 800 begins at step 810 where the UE 804 is connected with the source DU/TRP 802 exchanging data on the MCG bearer. At step 812, the UE 804 sends a measurement report/request to the source DU/TRP 802. At step 814, the source DU/TRP 802 decides to activate the S-TRP which is already configured as the target DUs/TRPs 806, 808. At step 816, the source DU/TRP 802 sends a MAC CE S-TRP activation request for target DU/TRP 806 and target DU/TRP 808 to the UE 804. The UE 804 will use the dedicated resources allocated during the pre-configuration phase to deliver the activation request message to the corresponding target DUs/TRPs 806, 808. In an aspect, there is a list of the target DUs/TRPs 806, 808 with a priority order to be activated in the activation request. The UE 804 will send the request to the DU/TRP 806 of the highest priority right after receiving the activation request from the source DU/TRP 802. Thus, at step 818, the UE 804 relays the preconfigured resources and activation to the target DU/TRP 806. At step 820, packet data is exchanged between the UE 804 and the source DU/TRP 802 from a split bearer and, at step 821, packet data is exchanged between the UE 804 and the target DU/TRP 806 from a split bearer. In an aspect, the UE 804 follows the guidance in the activation request to perform measurement(s) and, based on its measurement(s), decide when to send an activation request to target DU/TRP2 808 and/or other TRPs in the list from the original activation request. Thus, at step 822, the UE 804 sends relays the preconfigured resources and activation to the target DU/TRP 808. At step 824, the UE 804 exchanges packet data with the target DU/TRP 808 from a split bearer. At step 828, the UE 804 deactivates the connection with the source TRP 802 after the expiration of a timer 826 at the UE 804. This deactivation step 828 may be performed prior to sending the activation request to the target DU/TRP 808 in step 822. At step 829, the UE 804 deactivates the connection with the target DU/TRP 806 after the expiration of a timer 827 at the UE 804.

Figure 9:
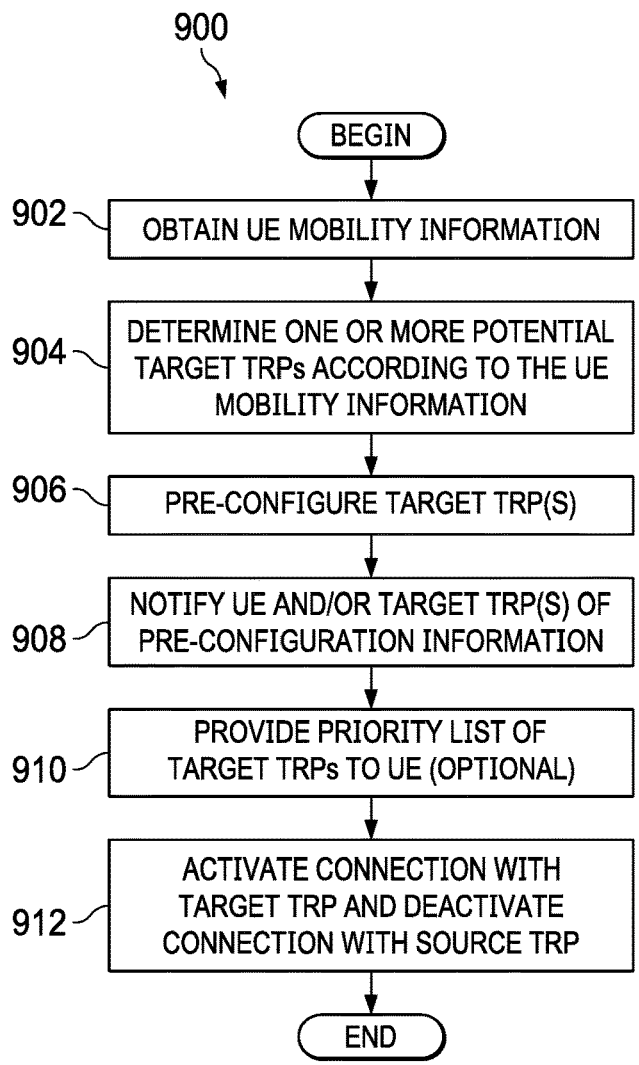
FIG. 9 shows a flowchart of an embodiment of a method for pre-configuring target TRPs for HO of a UE.

FIG. 9 shows a flowchart of an embodiment of a method 900 for pre-configuring target TRPs for HO of a UE. The method 900 begins at block 902 where the source TRP or other network component obtains the UE mobility information. The UE mobility information indicates a possible or probably future location of the UE. In an aspect, the UE transmits its mobility information to the source TRP. The mobility information may include a trip route obtained from a navigation application on the UE. Alternatively, the TRP or network component may determine the UE mobility information based on a predicted future position of the UE. The predicted future position may be based on past UE locations and speed and direction of travel. In an aspect, the predicted future position may be based on UE habits determined according to previous travel and locations and time stamps. For example, if the UE usually travels from location A to B every Monday through Thursday at a specific time, the source TRP or other network component may predict that the UE will travel through the same locations at the same times on future Mondays. However, the source TRP may determine that the current position and movement of the UE indicate that the usual travel plan is not being used and adjust its predicted location accordingly using other information.

Regardless of how the source TRP or other network component obtains the UE mobility information, at step 904, the source TRP or other network component determines one or more potential target TRPs according to the UE mobility information. At step 906, the source TRP or other network component pre-configures the target TRP(s) to be the serving TRP after a completion of a handover procedure. At step 908, the source TRP or other network component notifies the UE of the pre-configured target TRP(s) and/or notifies the target TRP(s) of the UE. At step 910, the source TRP or other network component may optionally provide a priority list of target TRPs to the UE. The priority list indicates the order in which the UE should activate connection with the target TRPs. At step 912, the connection with the target TRP is activated and the connection with the source TRP is deactivated, after which, the method 900 may end.

Figure 10:
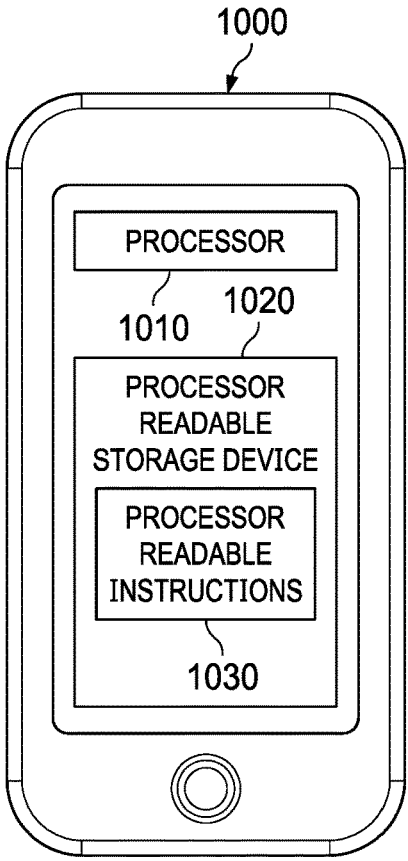
FIG. 10 is a block diagram of an example apparatus for wireless communication.

FIG. 10 is a block diagram of an example apparatus 1000 for wireless communication. The example apparatus 1000 may be a UE and thus may have various elements that would normally be a part of such an apparatus, such as a key pad, display screen, speaker, microphone, etc. However, it is understood that the apparatus 1000 may be implemented in many different ways using different units and/or components. In the example of FIG. 10, the apparatus 1000 includes a processor 1010 and a processor readable or non-transitory storage device 1020. The processor readable storage device 1020 has stored thereon processor executable instructions 1030 that when executed by the processor cause the processor to perform a method consistent with the methods described above. In another example (not shown), the apparatus 1000 may be implemented in hardware only (in circuitry, such as a processor, that is configured to perform the methods described herein and/or to otherwise control the execution of functionality and/or embodiments as disclosed herein. The apparatus could be configured to interface with a separate (Radio-Frequency-RF) transmission module. For example, the apparatus may be implemented in hardware or circuitry (e.g. in one or more chipsets, microprocessors, application-specific integrated circuits (ASIC), field-programmable gate arrays (FPGAs), dedicated logic circuitry, or combinations thereof) so as to select a set of signal processing operations as described herein to generate a NoMA signal for transmission by a separate (RF) unit (via an appropriate transmission interface).

Figure 11:
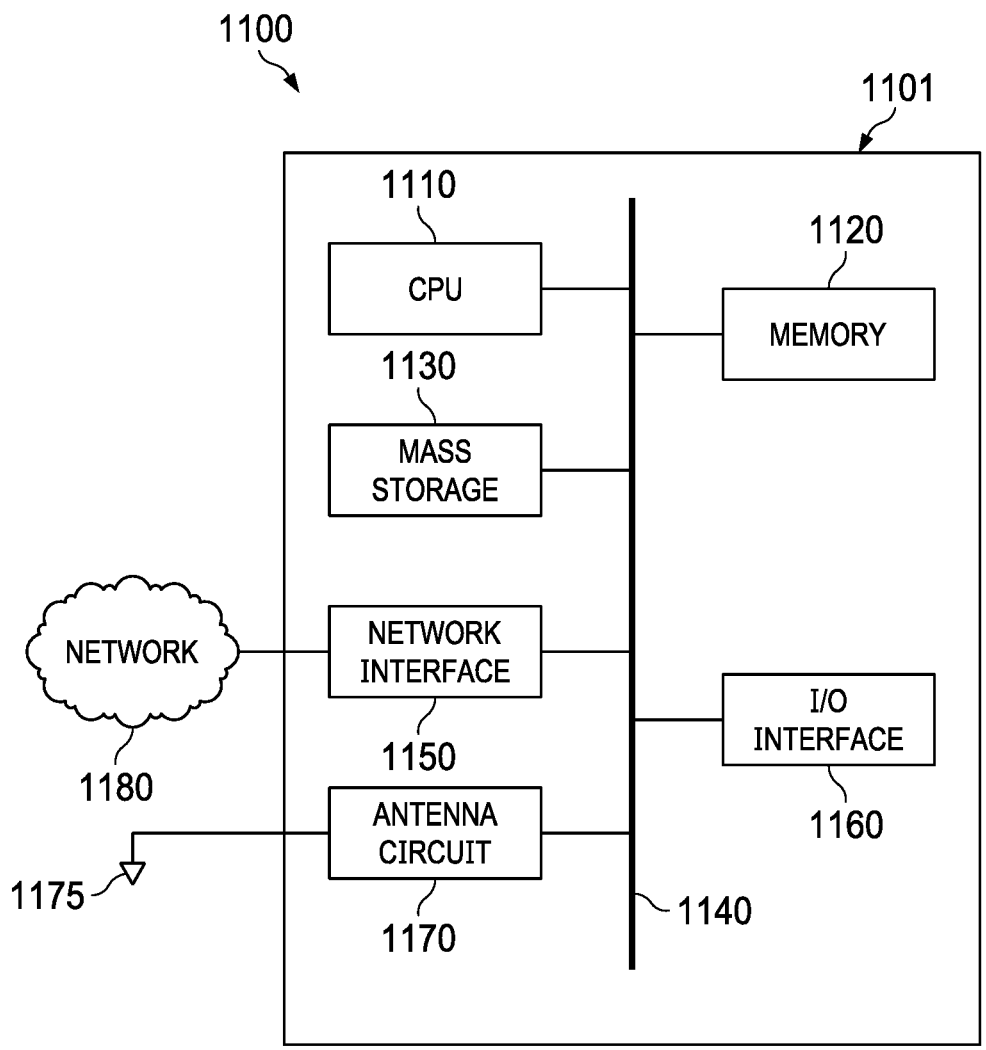
FIG. 11 is a block diagram of a processing system that may be used for implementing the devices and methods disclosed herein.

FIG. 11 is a block diagram of a processing system 1100 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 1100 may comprise a processing unit 1101 equipped with one or more input/output devices, such as a speaker, microphone, mouse, touchscreen, keypad, keyboard, printer, display, and the like. The processing unit 1101 may include a central processing unit (CPU) 1110, memory 1120, a mass storage device 1130, a network interface 1150, an I/O interface 1160, and an antenna circuit 1170 connected to a bus 1140. The processing unit 1101 also includes an antenna element 1175 connected to the antenna circuit.

The bus 1140 may be one or more of any type of several bus architectures including a memory bus or memory controller, a peripheral bus, video bus, or the like. The CPU 1110 may comprise any type of electronic data processor. The memory 1120 may comprise any type of system memory such as static random access memory (SRAM), dynamic random access memory (DRAM), synchronous DRAM (SDRAM), read-only memory (ROM), a combination thereof, or the like. In an embodiment, the memory 1120 may include ROM for use at boot-up, and DRAM for program and data storage for use while executing programs.

The mass storage device 1130 may comprise any type of storage device configured to store data, programs, and other information and to make the data, programs, and other information accessible via the bus 1140. The mass storage device 1130 may comprise, for example, one or more of a solid state drive, hard disk drive, a magnetic disk drive, an optical disk drive, or the like.

The I/O interface 1160 may provide interfaces to couple external input and output devices to the processing unit 1101. The I/O interface 1160 may include a video adapter. Examples of input and output devices may include a display coupled to the video adapter and a mouse/keyboard/printer coupled to the I/O interface. Other devices may be coupled to the processing unit 1101 and additional or fewer interface cards may be utilized. For example, a serial interface such as Universal Serial Bus (USB) (not shown) may be used to provide an interface for a printer.

The antenna circuit 1170 and antenna element 1175 may allow the processing unit 1101 to communicate with remote units via a network. In an embodiment, the antenna circuit 1170 and antenna element 1175 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 1170 and antenna element 1175 may also provide Bluetooth and/or WiFi connection to other devices.

The processing unit 1101 may also include one or more network interfaces 1150, which may comprise wired links, such as an Ethernet cable or the like, and/or wireless links to access nodes or different networks. The network interface 1101 allows the processing unit 1101 to communicate with remote units via the networks 1180. For example, the network interface 1150 may provide wireless communication via one or more transmitters/transmit antennas and one or more receivers/receive antennas. In an embodiment, the processing unit 1101 is coupled to a local-area network or a wide-area network for data processing and communications with remote devices, such as other processing units, the Internet, remote storage facilities, or the like.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a configuring unit/module for pre-configuring a target TRP; an activating unit/module for activating a connection; a monitoring unit/module for monitoring wireless signals to determine if the UE is within the coverage area of the TRP. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments

What is claimed is:

1. A method in a network component for handover of a user equipment (UE), comprising:
   configuring, by the network component, at least one target secondary serving transmission reception point (TRP) prior to the UE moving into a border area between the at least one target secondary serving TRP and a source TRP and prior to activating the at least one target secondary serving TRP, the at least one target secondary serving TRP determined according to UE mobility information; and
   activating, by the network component, the at least one target secondary serving TRP by transmitting an activation message to the UE, the UE relaying the activation message to the at least one target secondary serving TRP or the source TRP.

2. The method of claim 1, wherein configuring the at least one target secondary serving TRP includes configuring the at least one target secondary serving TRP with a dedicated access resource for the UE.

3. The method of claim 1, wherein configuring the at least one target secondary serving TRP includes configuring a plurality of target secondary serving TRPs, and activating the at least one target secondary serving TRP includes activating one of the plurality of target secondary serving TRPs.

4. The method of claim 1, wherein the UE mobility information comprises one of UE travel route, UE location, UE speed, and UE location history.

5. The method of claim 1, wherein the at least one target secondary serving TRP is configured prior to the UE obtaining a reliable measurement on the at least one target secondary serving TRP.

6. The method of claim 1, further comprising pre-configuring a dedicated access resource for the UE, the UE relaying the activation message to the at least one target secondary serving TRP over the dedicated access resource.

7. The method of claim 1, further comprising pre-configuring one or more monitor opportunities between the at least one target secondary serving TRP and the UE, wherein the at least one target secondary serving TRP transmits the activation message to the UE in accordance with the one or more monitor opportunities.

8. The method of claim 1, wherein activating the at least one target secondary serving TRP is based on a measurement of the UE's uplink reference signals.

9. The method of claim 1, wherein the activation message is a medium access control (MAC) control element (CE) message.

10. The method of claim 1, wherein the activation message is an activation request relayed by the UE from the source TRP to the at least one target secondary serving TRP.

11. The method of claim 1, wherein the activation message is an activation notification relayed by the UE from the at least one target secondary serving TRP to the source TRP.

12. A method in a user equipment (UE), comprising:
    receiving, by the UE, an identification of one or more target transmission reception points (TRPs) for handover of the UE from a source TRP for the handover of the UE before the UE is within a coverage area of the one or more target TRPs, the one or more target TRPs identified according to UE mobility information;
    receiving a dedicated access resource allocated at the one or more target TRPs or at the source TRP;
    accepting configuration of monitor opportunities between the one or more target TRPs and the UE; and
    activating a connection between the UE and the one or more target TRPs according to an activation event, the activation event triggering the UE relaying an activation request to the one or more target TRPs or an activation notification to the source TRP via the dedicated access resource.

13. The method of claim 12, further comprising:
    monitoring time slots of the monitor opportunities to receive the activation notification from the one or more target TRPs.

14. The method of claim 12, wherein the UE relays the activation request from the source TRP to the one or more target TRPs.

15. The method of claim 12, wherein the UE relays the activation notification from the one or more target TRPs to the source TRP.

16. The method of claim 12, wherein the activation event being the UE receiving the activation request from the source TRP or the activation notification from the one or more target TRPs.

17. A network node in a wireless network, the network node comprising:
    a processor; and
    a computer readable storage medium storing programming for execution by the processor, the programming including instructions to:
    configure at least one target secondary serving transmission reception point (TRP) prior to a user equipment (UE) moving into a border area between the at least one target secondary serving TRP and a source TRP and prior to activating the at least one target secondary serving TRP, the at least one target secondary serving TRP determined according to UE mobility information; and
    activate the at least one target secondary serving TRP by transmitting an activation message to the UE, the UE relaying the activation message to the at least one target secondary serving TRP or the source TRP.

18. The network node of claim 17, wherein instructions to configure the at least one target secondary serving TRP include instructions to configure the at least one target secondary serving TRP with a dedicated access resource for the UE.

19. The network node of claim 17, wherein instructions to configure the at least one target secondary serving TRP include instructions to configure a plurality of target secondary serving TRPs, and activating the at least one target secondary serving TRP includes activating one of the plurality of target secondary serving TRPs.

20. The network node of claim 17, wherein the UE mobility information comprises one of UE travel route, UE location, UE speed, and UE location history.

21. The network node of claim 17, wherein the at least one target secondary serving TRP is configured prior to the UE obtaining a reliable measurement on the at least one target secondary serving TRP.

22. The network node of claim 17, wherein the programming further comprises instructions to pre-configure a dedicated access resource for the UE, the UE relaying the activation message to the at least one target secondary serving TRP over the dedicated access resource.

23. The network node of claim 17, wherein the programming further comprises instructions to pre-configure one or more monitor opportunities between the at least one target secondary serving TRP and the UE, wherein the at least one target secondary serving TRP transmits the activation message to the UE in accordance with the one or more monitor opportunities.

24. The network node of claim 17, wherein the activation message is an activation request relayed by the UE from the source TRP to the at least one target secondary serving TRP.

25. The network node of claim 17, wherein the activation message is an activation notification relayed by the UE from the at least one target secondary serving TRP to the source TRP.

26. A user equipment (UE) in a wireless network, the UE comprising:
   a processor; and
   a computer readable storage medium storing programming for execution by the processor, the programming including instructions to:
   receive an identification of one or more target transmission reception points (TRPs) for handover of the UE from a source TRP for the handover of the UE before the UE is within a coverage area of the one or more target TRPs, the one or more target TRPs identified according to UE mobility information;
   receive a dedicated access resource allocated at the one or more target TRPs or at the source TRP;
   accept configuration of monitor opportunities between the one or more target TRPs and the UE; and
   activate a connection between the UE and the one or more target TRPs according to an activation event, the activation event triggering the UE relaying an activation request to the one or more target TRPs or an activation notification to the source TRP via the dedicated access resource.

27. The UE of claim 26, wherein the activation event being the UE receiving the activation request from the source TRP or the activation notification from the one or more target TRPs.

* * * * *